United States Patent [19]

Ashikawa et al.

[11] Patent Number: 4,976,668
[45] Date of Patent: Dec. 11, 1990

[54] FINAL REDUCTION GEAR UNIT FOR AN AUTOMOBILE

[75] Inventors: Noboru Ashikawa; Toshiyuki Yumoto, both of Saitama, Japan

[73] Assignee: Honda Giken Kogyo Kabushiki Kaisha, Tokyo, Japan

[21] Appl. No.: 282,635

[22] Filed: Dec. 9, 1988

[30] Foreign Application Priority Data

Dec. 11, 1987 [JP] Japan ................. 62-313826

[51] Int. Cl.$^5$ ................. F16H 37/08; F16H 57/02
[52] U.S. Cl. ........................ 475/221; 74/607
[58] Field of Search ............. 74/694, 700, 607; 475/220, 221

[56] References Cited

U.S. PATENT DOCUMENTS

| | | | |
|---|---|---|---|
| 1,487,563 | 3/1924 | Hawley | 74/694 |
| 1,849,429 | 3/1932 | Logan | 74/694 |
| 2,069,411 | 2/1937 | Keese | 74/694 X |
| 2,383,954 | 9/1945 | Buckendale et al. | 74/694 |
| 3,122,944 | 3/1964 | Boehner et al. | 74/700 |
| 3,150,543 | 9/1964 | Dangauthier | 74/700 |
| 3,489,237 | 1/1970 | Winsen et al. | 74/700 |
| 3,494,225 | 2/1970 | Binder et al. | 74/700 |
| 4,193,222 | 3/1980 | Morino et al. | 74/700 |
| 4,258,587 | 3/1981 | Morino | 74/700 |
| 4,606,243 | 8/1986 | Ashikawa et al. | 74/700 |

FOREIGN PATENT DOCUMENTS 58-24289 5/1983 Japan.
1165859 10/1969 United Kingdom ............. 74/700

Primary Examiner—Dwight Diehl
Attorney, Agent, or Firm—Lyon & Lyon

[57] ABSTRACT

An automobile has a final reduction gear unit including an orthogonal converter gear train, a speed reducer gear train, and a differential gear train which are mounted on one side of the engine of the automobile. The orthogonal converter gear unit includes a drive bevel gear coupled to a first rotatable shaft for rotation about the axis thereof, and a driven bevel gear mounted on a second rotatable shaft normal to the first rotatable shaft and rotatable about the axis of the second rotatable shaft. The speed reducer gear train includes a drive cylindrical gear mounted on the second rotatable shaft, and a driven cylindrical gear held in mesh with the drive cylindrical gear and mounted on a third shaft for rotation thereabout, the third rotatable shaft lying parallel to the second rotatable shaft. The differential gear train has four bevel gears combined with the driven cylindrical gear for distributing power from the engine of the automobile transmitted to the driven cylindrical gear, to road wheels of the automobile.

5 Claims, 6 Drawing Sheets

FINAL REDUCTION GEAR UNIT FOR AN AUTOMOBILE

BACKGROUND OF THE INVENTION

The present invention relates to a final reduction gear unit for an automobile, and a more particularly to a final reduction gear unit including an input shaft extending longitudinally of an automobile body and an output shaft extending transversely of the automobile body for transmitting engine power to a pair of laterally spaced road wheels.

Some front-wheel-drive or four-wheel-drive automobiles having engines with crankshafts directed longitudinally of the automobile body include, as shown in FIGS. 8A and 8B of the accompanying drawings, a gear transmission comprising a torque converter (or clutch) 2 and a transmission mechanism 3 with a final reduction gear unit 4 disposed therebetween.

With the illustrated arrangement, an engine 1 overhangs forwardly of a pair of laterally spaced road wheels 5 disposed on the opposite sides of the final reduction gear unit 4. Therefore, the automobile is heavier at its front portion than at its rear portion, i.e., the weight of the automobile is not uniformly distributed in its longitudinal direction. Since the road wheels 5 are positioned closely to the engine compartment of the automobile, the passenger compartment, and particularly the a foot space in front of the front seats, is small.

Japanese Patent Publication No. 58(1983)-24289 discloses, as shown in FIG. 9 of the accompanying drawings, a final reduction gear unit 4 disposed directly underneath an engine 1. To hold a transmission 7 out of the passenger compartment, i.e., to make the passenger compartment wide, the transmission 7 is located below the output shaft of the engine 1, and the output of a torque converter 6 and the input shaft of the transmission 7 are operatively coupled to each other by sprockets 8a, 8b and a chain 8c looped therearound.

The disclosed layout allows road wheels to be positioned more forwardly and reduces the forward overhang of the engine 1, giving a wider passenger compartment space. Inasmuch as the final reduction gear unit 4 is positioned beneath the engine 1, however, the engine 1 has a relatively large height with respect to the automobile body, and so does the engine hood. This is disadvantageous in that the driver of the automobile has limited sight in the forward direction, and the automobile becomes less stable as the center of gravity of the engine 1 is higher. It is therefore desirable to minimize the vertical dimension of the final reduction gear unit in the design shown in FIG. 9.

In view of the aforesaid problems, it has been proposed to locate a final reduction gear unit laterally of an engine with an axle shaft extending through the engine case, lowering the engine position with respect to the automobile body. Nonetheless, the axle shaft must be positioned downwardly of the crankshaft of the engine. Consequently, it is also desirable with this scheme that the vertical dimension of the final reduction gear unit be as small as possible in order to lower the engine position.

SUMMARY OF THE INVENTION

It is an object of the present invention to provide a final reduction gear unit for use in an automobile which is compact in structure, and particularly a final reduction gear unit which is small in its vertical dimension.

To achieve the above object, there is provided in accordance with the present invention a final reduction gear unit for use in an automobile, comprising: an orthogonal converter gear train including a first rotatable input shaft adapted to extend in a longitudinal direction of the automobile, a drive bevel gear coupled to the first rotatable shaft for rotation about an axis thereof, a second rotatable shaft lying perpendicularly to the first rotatable shaft and adapted to extend in a transverse direction of the automobile, and a driven bevel gear mounted on the second rotatable shaft for rotation about an axis thereof; a speed reducer gear train including a drive cylindrical gear mounted on the second rotatable shaft for rotation with said driven bevel gear, a third rotatable shaft extending parallel to the second rotatable shaft, and a driven cylindrical gear held in mesh with the drive cylindrical gear and mounted on the third shaft for rotation thereabout; and a differential gear train combined with the driven cylindrical gear for distributing power from the engine of the automobile transmitted to the driven cylindrical gear, to road wheels of the automobile.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
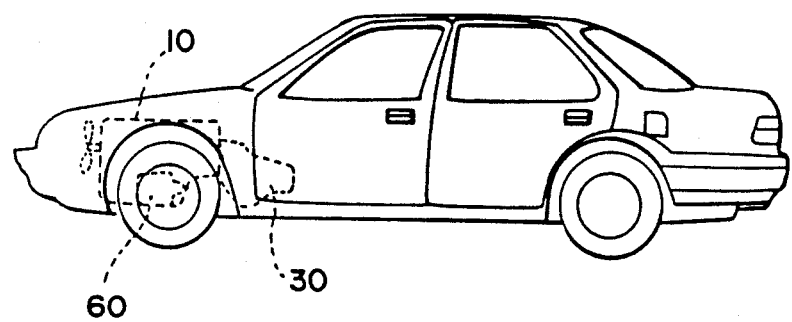
FIG. 1 is a side elevational view of an automobile including a drive system having a final reduction gear unit according to the present invention.
Figure 2:
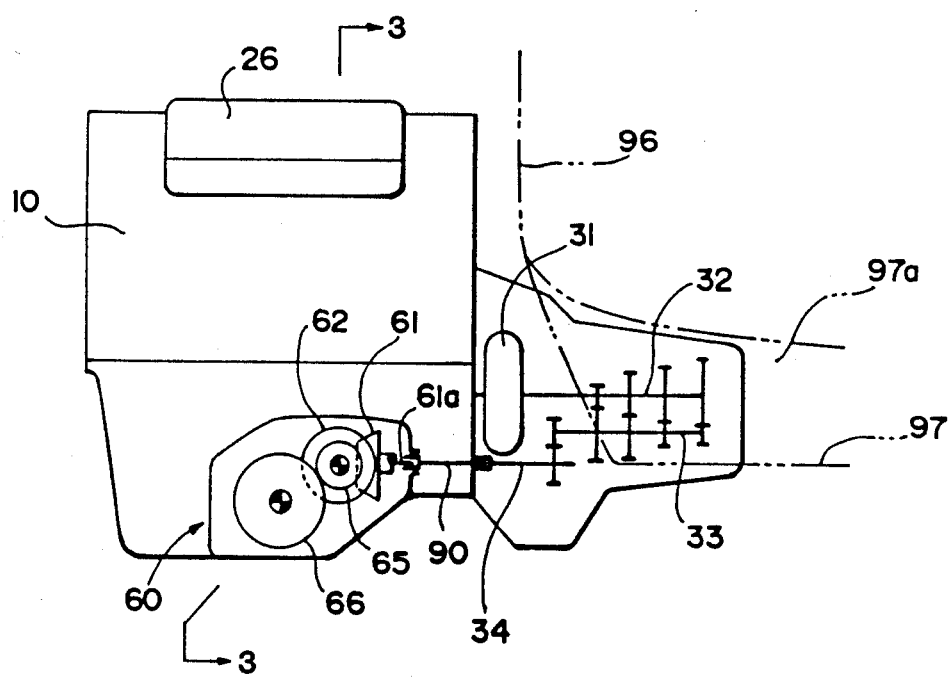
FIG. 2 is a schematic side elevational view of the drive system.

FIG. 1 shows an automobile equipped with a final reduction gear unit according to the present invention. The automobile has a drive system installed in its front portion and comprising an engine 10, a transmission 30, and a final reduction gear unit 60. The drive system is schematically shown in FIG. 2. The engine 10 has a crankshaft extending longitudinally of the automobile and having a rear end coupled to the transmission 30. The final reduction gear unit 60 is joined to a lefthand side of the engine 10. The output shaft of the engine 10 is connected coaxially to an input shaft 32 of the transmission 30 through a torque converter 31. The transmission 30 includes a countershaft-type transmission mechanism disposed between the input shaft 32 and a countershaft 33 extending parallel to the input shaft 32. The counter shaft 33 is operatively coupled to an output shaft 34 through an output gear train.

The final reduction gear unit 60 has an orthogonal converter gear train comprising a drive bevel gear 61 and a driven bevel gear 62, a speed reducer gear train comprising a drive cylindrical gear and a driven cylindrical gear, and a differential gear train comprising four bevel gears. The final reduction gear unit 60 on the lefthand side of the engine 1 is separate from the transmission 30. The transmission output shaft 34 is held substantially coaxially with an input shaft 61a of the final reduction gear unit 60 and coupled thereto through an intermediate shaft 90.

An engine compartment and a passenger compartment of the automobile are separated from each other by a dashboard panel 96 and a floor panel 97. The engine 10, the transmission 30, and the final reduction gear unit 60 are disposed in the engine compartment, with the transmission 30 partly projecting into a lower portion of the passenger compartment. Since the final reduction gear unit 60 is mounted on the side of the engine 10, the engine 10 is considerably low in position with respect to the body of the automobile. Therefore, the transmission 30 is also positionally low, disposed in a tunnel 97a extending on the floor panel 97 in the longitudinal direction of the automobile body. The extent to which the transmission 30 projects into the passenger compartment is relatively small, thus making a wide passenger compartment space available. Since the engine hood is also lowered by lowering the engine 10, forward sight as viewed from the driver's seat is wide.

The drive system will be described in greater detail with reference to FIGS. 3 and 4.

Figure 3:
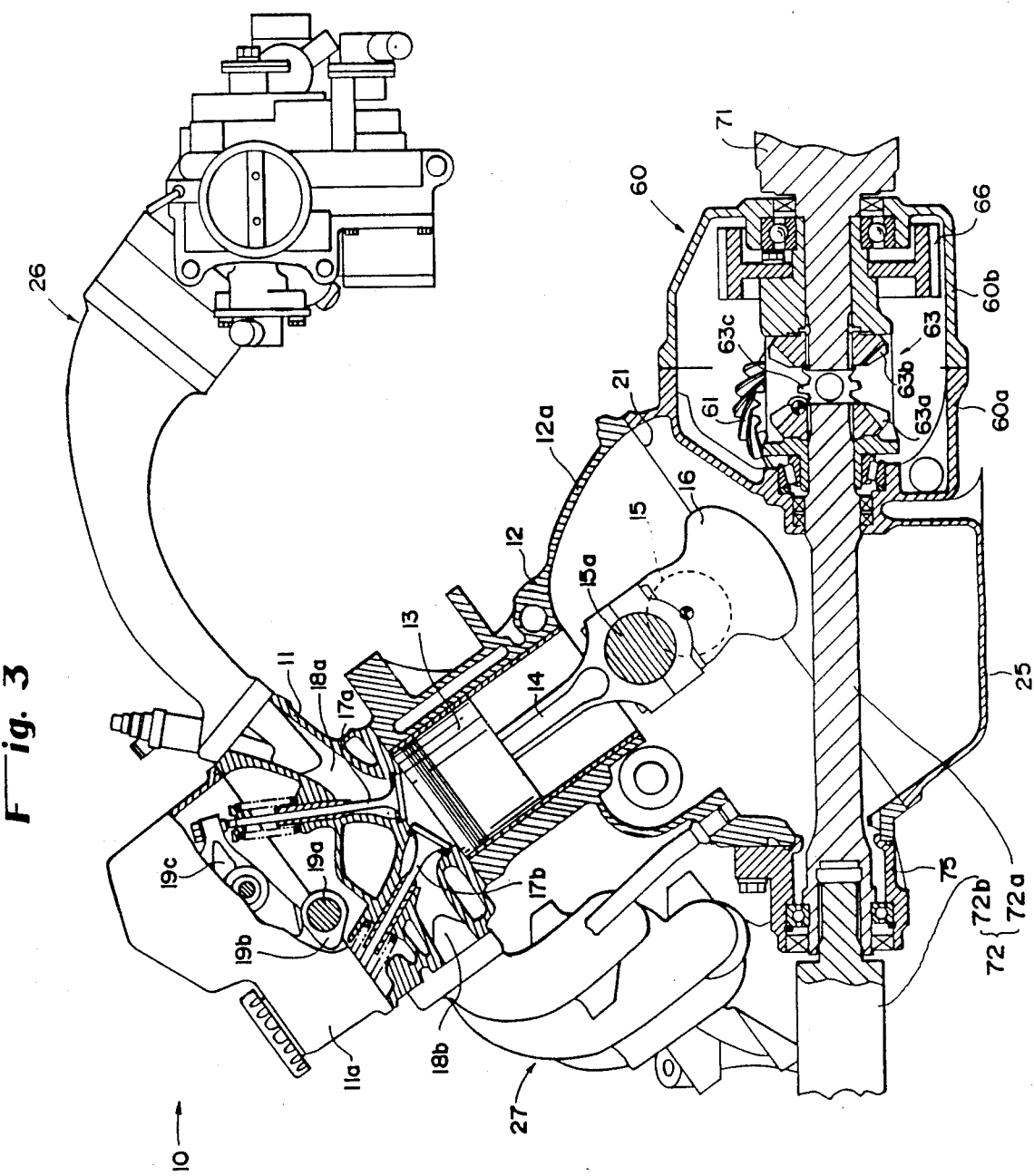
FIG. 3 is an enlarged cross-sectional view taken along line 3—3 of FIG. 2.

The engine 10 is an in-line multicylinder engine having a plurality of cylinders, the axes of which are inclined to the left (to the righthand side of the automobile body) from the vertical as viewed from the front of the automobile as shown in FIG. 3. The engine 10 has an engine case comprising a cylinder block 12 in which pistons 13 are slidably accommodated for reciprocating sliding movement along the cylinder axes, a cylinder head 11 coupled to the upper surface of the cylinder block 12 and having intake and exhaust passages 18a, 18b and intake and exhaust passages 18a, 18b, respectively, and an oil pan 25 coupled to the lower surface of the cylinder block 12.

The intake passages 18a are open at the side surface of the cylinder head 11 which faces away from the direction in which the cylinder axes are inclined. The open ends of the intake passages 18a are connected to an intake manifold 26. The exhaust passages 18b are open at the opposite side surface of the cylinder head 11 which faces in the direction in which the cylinder axes are inclined. An exhaust manifold 27 connected to the open ends of the exhaust passages 18b is mounted on the engine case.

A camshaft 19a having a plurality of cams 19b thereon arranged therealong is rotatably mounted on an upper end of the cylinder head 11, the camshaft 19a extending along the cylinder bank, i.e., in the longitudinal direction of the automobile. Upon rotation of the camshaft 19a in synchronism with engine rotation, the cams 19b cause rocker arms 19c to open and close the intake and exhaust valves 17a, 17b. The camshaft 19a and the rocker arms 19c are covered with a head cover 11a mounted on the upper surface of the cylinder head 11.

The cylinder block 12 includes a lower crankcase 12a in which a crankshaft 15 extending longitudinally is rotatably mounted. The crankshaft 15 includes a plurality of cranks 15a on which there are rotatably mounted connecting rods 14a having upper ends coupled to the respective pistons 13. The crankshaft 15 is rotated about its own axis through the connecting rods 14 and the cranks 15a in response to reciprocating movement of the pistons 13. Counterweights 16 are mounted on the crankshaft 15 and project away from the cranks 15a.

The oil pan 25 is joined to the lower surface 21 of the crankcase 12a of the cylinder block 12. As shown in FIG. 3, the lower joint surface 21 lies perpendicularly to the cylinder axes, and is inclined to the horizontal plane at the same angle as the angle of inclination of the cylinder axes.

The final reduction gear unit 60 is installed on the side surface of the oil pan 25 which faces away from the direction in which the engine 10 is inclined. The oil pan 25 has a case 60a accommodating therein an internal mechanism of the final reduction gear unit 60. The final reduction gear unit 60 is thus integral with the engine 10. The structure of the final reduction gear unit 60 will be described later on.

Figure 4:
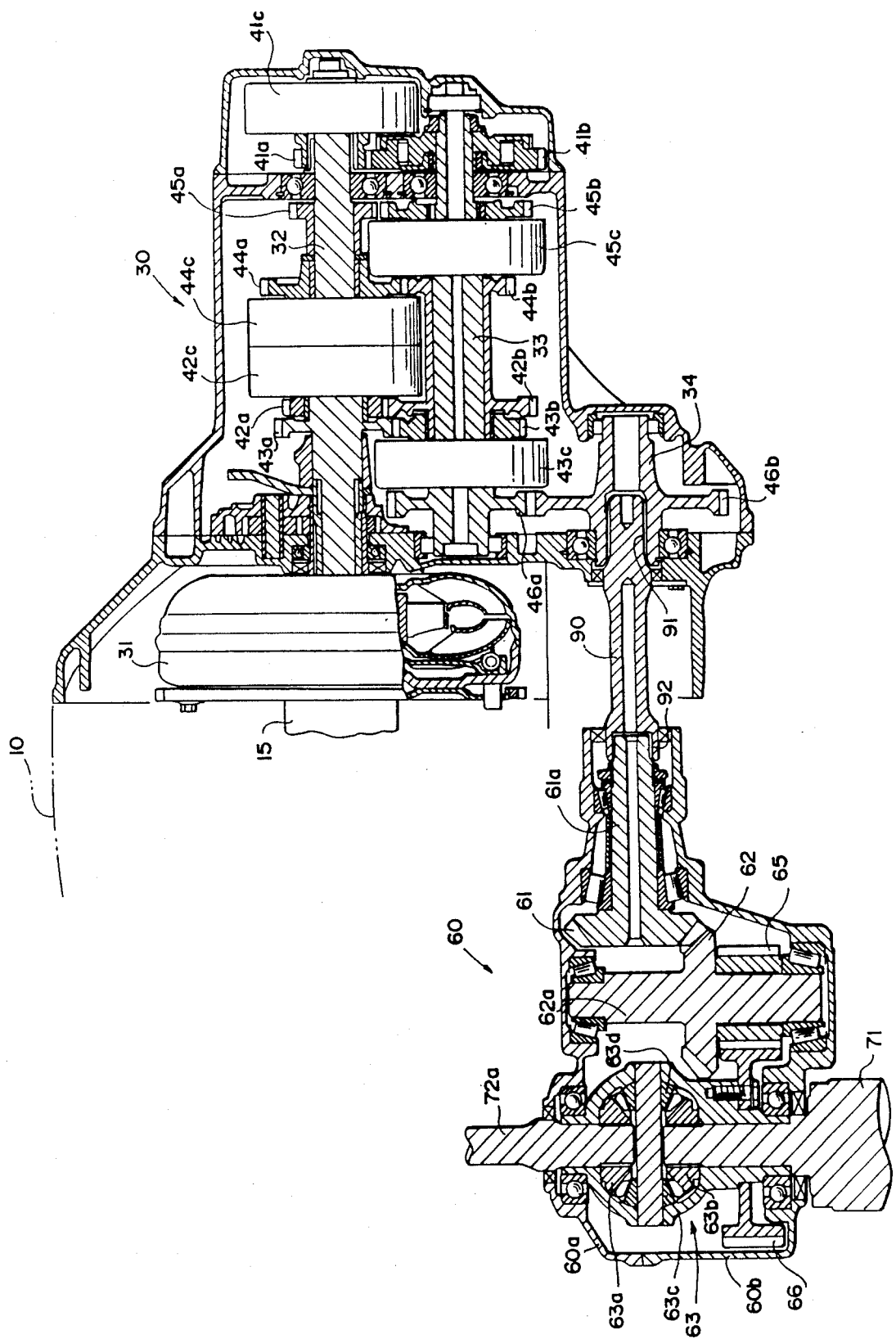
FIG. 4 is an enlarged cross-sectional view of the drive system taken along the shafts of a transmission.

As shown in FIG. 4, the transmission 30 is connected to the rear end of the engine 10, the illustrated transmission 30 being an automatic transmission. The torque converter 31 is coupled to the output shaft (crankshaft) 15 of the engine 10 and has an output shaft serving as the transmission input shaft 32. Between the transmission input shaft 32 and the transmission countershaft 33, there are disposed five gear trains, i.e., a first gear position gear train comprising intermeshing gears 41a, 41b, a second gear position gear train comprising intermeshing gears 42a, 42b, a third gear position gear train comprising intermeshing gears 43a, 43b, a fourth gear position gear train comprising intermeshing gears 44a, 44b, and a reverse gear position gear train comprising intermeshing gears 45a, 45b, 45d (the reverse idler gear 45d being not shown). These gear trains are associated with respective hydraulically operated clutches 41c, 42c, 43c, 44c, 45c for transmitting engine power through the gear trains. By selectively operating these clutches 41c, 42c, 43c, 44c, 45c, one of the five gear trains is selected to transmit engine power in the corresponding gear position.

The transmission countershaft 33 and the transmission output shaft 34 parallel thereto are operatively coupled to each other through an output gear train comprising intermeshing gears 46a, 46b. The engine output power transmitted through one of the five transmission gear trains which is selected by the corresponding hydraulically operated clutch is transmitted from the countershaft 33 to the output shaft 34. The output shaft 34 is positioned substantially coaxially with an input shaft 61a of the final reduction gear unit 60, and coupled thereto through the intermediate shaft 90 which has splines 91, 92 on its opposite ends.

The orthogonal converter gear train, speed reducer gear train, and differential gear train of the final reduction gear unit 60 are disposed in a space defined between the case 60a integral with the oil pan 25 and a cover 60b joined to the case 60a. The drive bevel gear 61 of the orthogonal converter gear train is integrally formed with the input shaft (first rotatable shaft) 61a of the final reduction gear unit 60, and is supported for rotation about the input shaft 61a which extends longitudinally of the automobile. The driven bevel gear 62 meshing with the drive bevel gear 61 is supported on a second rotatable shaft 62a extending transversely of the automobile in perpendicular relation to the input shaft 61a for rotation about the axis of the second rotatable shaft 62a. The speed reducer gear train includes a drive cylindrical gear 65 in the form of a spur gear fixedly mounted on the second rotatable shaft 62a adjacent to the driven bevel gear 62 remotely from the drive bevel gear 61. The speed reducer gear train also includes a driven cylindrical gear 66 which is held in mesh with the drive cylindrical gear 65 and has more teeth than those of the drive cylindrical gear 65. The driven cylindrical gear 66 is rotatable about an axle axis of axle shafts 71, 72 which extends in a transverse direction of the automobile. The axle axis is parallel to the second rotatable shaft 62a. The axle shafts 71, 72 are laterally spaced and coaxially placed.

The differential gear train designated generally by the reference numeral 63, comprises four bevel gears 63a, 63b, 63c, 63d. The bevel gears 63c, 63d are rotatably supported by the driven cylindrical gear 66, and the bevel gears 63a, 63b are coupled respectively to the axle shafts 71, 72.

The engine power transmitted to the transmission output shaft 34 is directionally changed through a right angle by the orthogonal converter gear train 61, 62, reduced in rotational speed by the speed reducer gear train 65, 66, and split and transmitted to the axle shafts 71, 72 through the differential gear train 63 to drive transversely spaced front road wheels coupled respectively to the axle shafts 71, 72.

Figure 5:
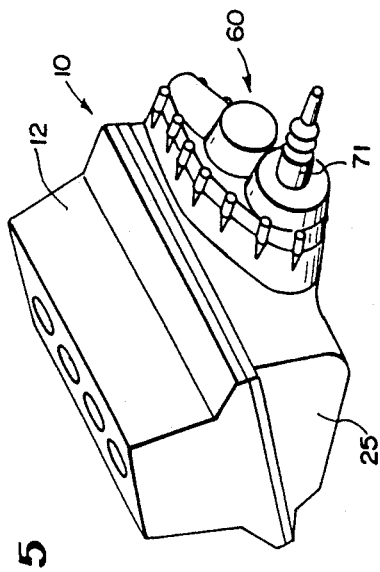
FIG. 5 is a perspective view of the final reduction gear unit as attached to a side of an engine.

The left axle shaft 71 extends away from the direction in which the engine 10 is inclined, and is coupled to the lefthand front road wheel. The right axle shaft 72 extends in the direction in which the engine 20 is inclined. The right axle shaft 72 comprises a first shaft 72a extending through the engine case (i.e., the oil pan 25 and the crankcase 12a) and rotatably supported in a shaft support member 75 attached to the side of the crankcase 12a remotely from the final reduction gear unit 60, and second shaft 72b coupled to the end of the first shaft 72a in the shaft support member 75 and extending outwardly and connected to the righthand front road wheel. The final reduction gear unit 60 integrally mounted on one side of the engine 10 is illustrated in FIG. 5.

Since the orthogonal converter gear train only serves to change the direction of the engine power, the drive and driven bevel gears 61, 62 thereof may be rendered compact in size by reducing the numbers of teeth thereof. Inasmuch as the gears 65, 66 of the speed reducer gear train are cylindrical gears, the outside diameters thereof for achieving a desired speed reduction ratio may be made smaller than the outside diameters of bevel and hypoid gears of conventional final reduction gear units. The conventional final reduction gear units have employed bevel gears or hypoid gears to change the direction of the engine power through a right angle as well as to reduce the rotational speed. According to the present invention, as described above, the engine power is directionally changed and reduced in speed separately by the respective gear trains, and thus the outside diameters of the gears may be reduced.

As a consequence, the vertical dimension of the final reduction gear unit 60 may be reduced to make the gear unit 60 compact in size. The compact final reduction gear unit 60 can easily be mounted on one side of the engine 10, and the vertical position of the engine 10 with respect to the automobile body can be lowered.

Figure 6:
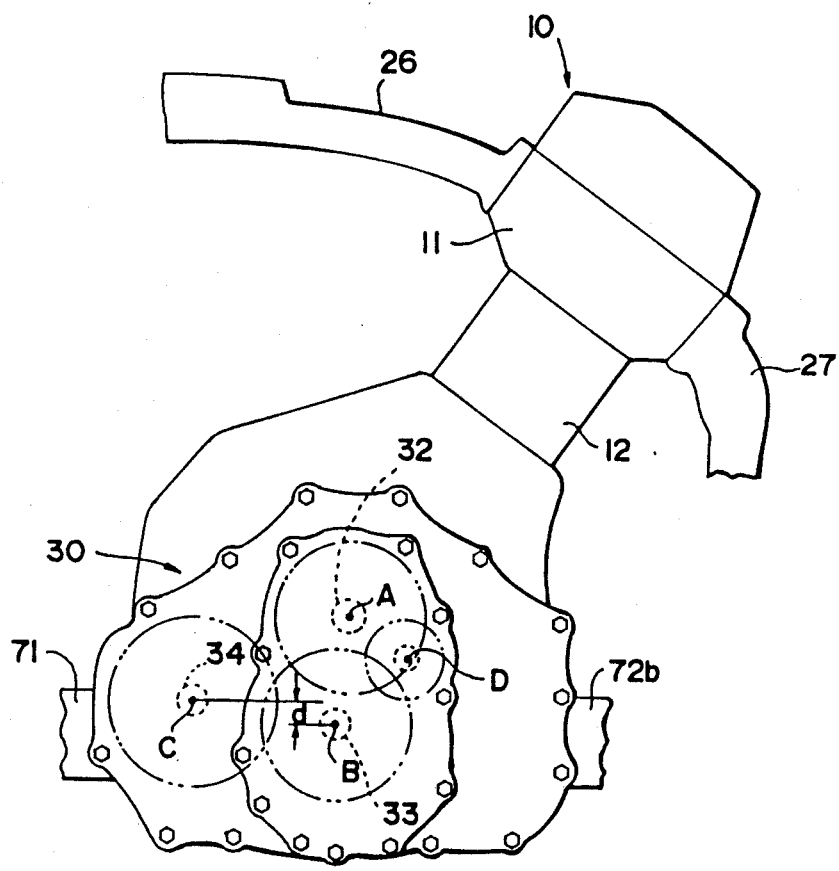
FIG. 6 is a rear elevational view of the drive system.
Figure 8A:
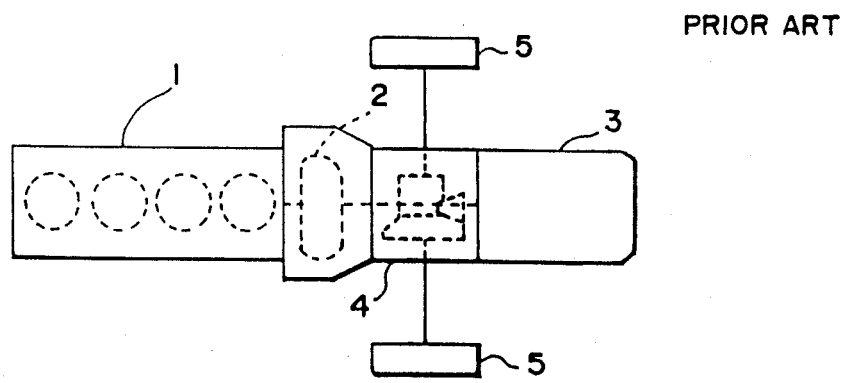
FIGS. 8A and 8B are views showing a conventional drive system.
Figure 8B:
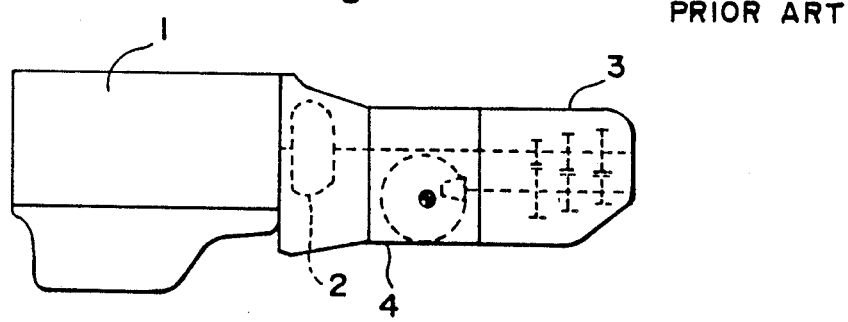

The drive system of the above construction is viewed from behind in FIG. 6. The crankshaft 15 of the engine 10 and the input shaft 32 of the transmission 30 each has its central axis positioned along an axial line normal to the sheet of FIG. 6, indicated at A. The transmission countershaft 33 has a central axis B positioned substantially below the central axis A of the transmission input shaft 32. The transmission output shaft 34 has a central axis C positioned laterally of the countershaft 33 and displaced upwardly from the countershaft 33 by a distance "d". With the shafts thus arranged, the transmission 30 is made compact, the transmission input shaft 32 is positioned coaxially with the crankshaft 15 of the engine 10, and the final reduction gear unit 60 having its input shaft 61a coaxial with the transmission output shaft 34 is disposed on one side of the engine without undue limitations. The reverse idler gear has its central axis located at D.

Figure 7:
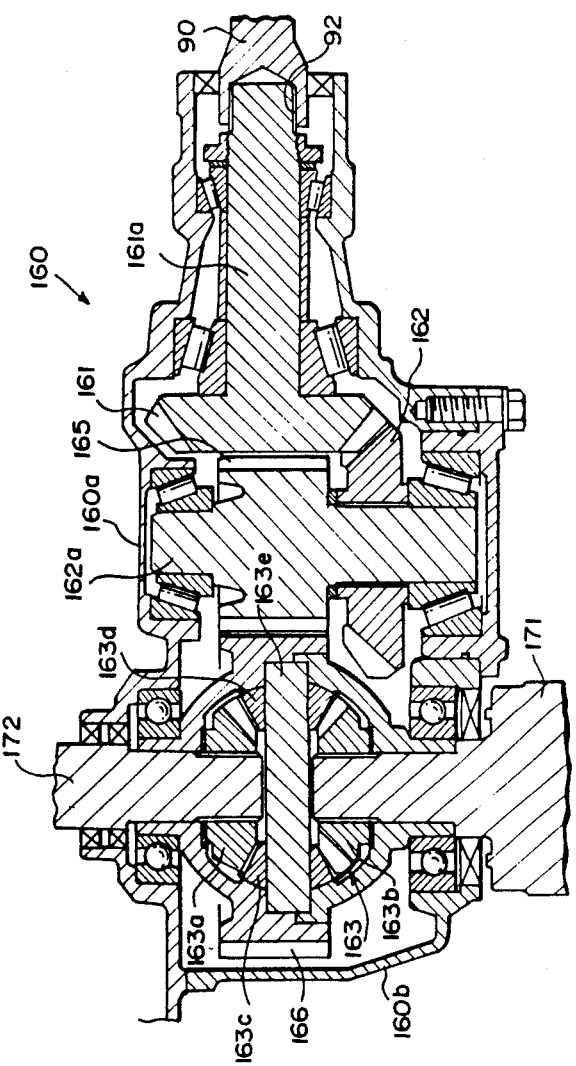
FIG. 7 is an enlarged cross-sectional view of a final reduction gear unit according to another embodiment of the present invention.

FIG. 7 shows a final reduction gear unit according to another embodiment of the present invention. the final reduction gear unit, generally denoted at 160, comprises an orthogonal converter gear train composed of a pair of drive and driven bevel gears 161, 162, s speed reducer gear train composed of a pair of drive and driven cylindrical gears 165, 166, and a differential gear train 163 composed of four bevel bears, these gear trains being disposed in a space surrounded by a case 160a and a cover 160b.

The drive bevel gear 161 is integrally formed with an input shaft (first rotatable shaft) 161a of the final reduction gear unit 160. The driven bevel gear 162 is held in mesh with the drive bevel gear 162 and fixedly mounted on a second rotatable shaft 162a lying perpendicularly to the input shaft 161a. The drive cylindrical gear 165 is integrally formed with the second rotatable shaft 162 and positioned on one side of the drive bevel gear 162 closely to and in confronting relation to the end face of the drive bevel gear 161.

The driven cylindrical gear 166 held in mesh with the drive cylindrical gear 165 is rotatably supported on a third rotatable shaft coaxial with axle shafts 171, 172 and parallel to the second rotatable shaft 162a. The differential gear train 163 is disposed within the driven cylindrical gear 166. More specifically, the differential gear train has a gear case integrally formed with the driven cylindrical gear 166 and comprises bevel gears 163c, 163d rotatably supported on a shaft 163e supported in the gear case, and bevel gears 163a, 163b meshing with the bevel gears 163c, 163d and coupled to the axle shafts 171, 172, respectively.

With the final reduction gear unit 160 thus constructed, the driven cylindrical gear 166 and the differential gear train 163 are diametrically aligned with each other, i.e., the latter is disposed diametrically within the former, and hence the combination of the gear 166 and the gear train 163 is reduced in axial dimension. Consequently, the dimension of the final reduction gear unit 160 in the transverse direction of the automobile is smaller than the transverse dimension of the final reduction gear unit 60 shown in FIGS. 3 and 4. As a result, the final reduction gear unit 160 is made more compact in size.

Figure 9:
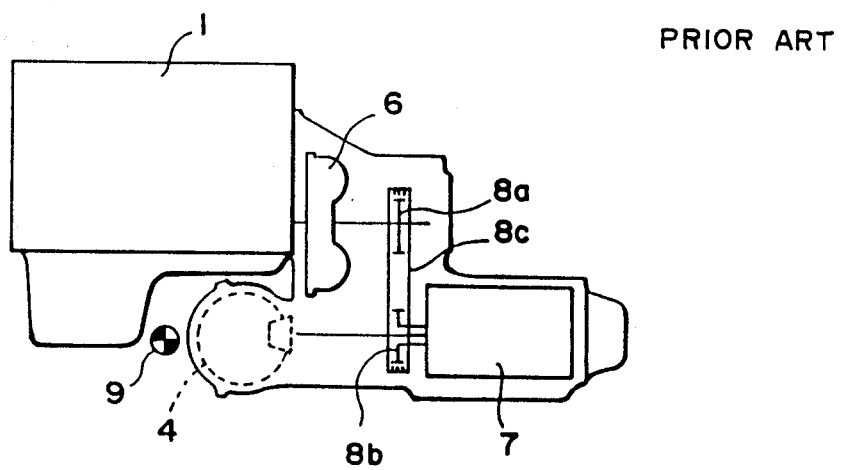
FIG. 9 is a view showing another conventional drive system.

In each of the above embodiments, the final reduction gear unit is mounted on one side of the engine. However, as shown in FIG. 9, the final reduction gear unit of the present invention may be disposed underneath the engine. In such a modification, the position of the engine can be lowered by reducing the vertical dimension of the final reduction gear unit. Therefore, the engine hood can also be lowered to give the driver wider forward sight, and the lowered center of gravity of the engine contributes to the stability of the automobile.

According to the present invention, as described above, a final reduction gear unit comprises an orthogonal converter gear train composed of drive and driven bevel gears, a speed reducer gear train coupled to the orthogonal converter gear train and composed of a drive cylindrical gear and a driven cylindrical gear, and a differential gear train combined with the driven cylindrical gear. The outside diameters of the gears of the final reduction gear unit may be smaller than those of the bevel or hypoid gears of a conventional final reduction gear unit, so that the final reduction gear unit can be rendered compact in size. Where the final reduction gear unit is disposed on one side of or beneath the engine, the position of the engine with respect to the automobile body may be lowered. With the engine position lowered, the engine hood is also lowered in position to allow the automobile driver to have wider forward sight, and the center of gravity of the engine is lowered to increase automobile stability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A final reduction gear unit for an automobile, comprising:

an orthogonal converter gear train including a first rotatable input shaft adapted to extend in a longitudinal direction of the automobile, a drive bevel gear coupled to said first rotatable shaft for rotation about an axis thereof, a second rotatable shaft lying perpendicularly to said first rotatable shaft and adapted to extend in a transverse direction of the automobile, and a driven bevel gear mounted on said second rotatable shaft for rotation about an axis thereof;

a speed reducer gear train including a drive cylindrical gear mounted on said second rotatable shaft for rotation with said driven bevel gear, and a driven cylindrical gear held in mesh with said drive cylindrical gear and rotatable about an axle axis;

a differential gear train combined with said driven cylindrical gear for distributing power, from an engine of the automobile transmitted to said driven cylindrical gear, to road wheels of the automobile; and first and second axle shafts for transmitting power from said differential gear train to the road wheels, one of said axle shafts extending through a case of said engine, said axle shafts positioned along said axle axis parallel to and laterally offset from said second rotatable shaft, wherein said engine includes (a) a crankshaft extending in the longitudinal direction of the automobile, said orthogonal converter gear train, said speed reducer gear train, and said differential gear train being disposed integrally on one side of said engine and (b) cylinder axes inclined from the vertical in the transverse direction of the automobile, said orthogonal converter gear train, said speed reducer gear train, and said differential gear train being disposed on the side of the engine which faces away from the direction in which said cylinder axes are inclined.

2. A final reduction gear unit according to claim 1, wherein said drive cylindrical gear is disposed on one side of said driven bevel gear remote from said drive bevel gear.

3. A final reduction gear unit according to claim 1, wherein said drive cylindrical gear is disposed on one side of said driven bevel gear adjacent to said drive bevel gear.

4. A final reduction gear unit according to claim 1, wherein said driven bevel gear is disposed on the opposite side of said drive bevel gear from an oil pan of said engine.

5. A final reduction gear unit according to claim 1, wherein said second shaft is positioned above said axle axis.

* * * * *